(12) United States Patent
Renyer et al.

(10) Patent No.: US 8,813,865 B2
(45) Date of Patent: *Aug. 26, 2014

(54) COULTER UNIT FOR HIGH SPEED TILLAGE APPLICATIONS

(75) Inventors: Jim Renyer, Sabetha, KS (US); Greg Renyer, Sabetha, KS (US)

(73) Assignee: AgSynergy, LLC, Seneca, KS (US)

( * ) Notice: Subject to any disclaimer, the term of this patent is extended or adjusted under 35 U.S.C. 154(b) by 338 days.

This patent is subject to a terminal disclaimer.

(21) Appl. No.: 13/363,939

(22) Filed: Feb. 1, 2012

(65) Prior Publication Data

US 2012/0241180 A1  Sep. 27, 2012

Related U.S. Application Data

(63) Continuation-in-part of application No. 13/072,409, filed on Mar. 25, 2011, now abandoned.

(51) Int. Cl.
*A01B 15/00* (2006.01)
*A01C 5/06* (2006.01)
*A01C 23/02* (2006.01)
*A01C 7/20* (2006.01)

(52) U.S. Cl.
CPC .............. *A01C 5/064* (2013.01); *A01C 23/024* (2013.01); *A01C 7/203* (2013.01)
USPC .......................................... 172/518; 111/163

(58) Field of Classification Search
USPC ........... 111/52, 118, 121, 137, 163, 167, 168, 111/169, 170, 157, 189, 194, 200; 172/78, 172/166, 175, 180, 518, 519, 536, 537, 538, 172/539, 397, 744, 773, 561, 562
See application file for complete search history.

(56) References Cited

U.S. PATENT DOCUMENTS

| | | | |
|---|---|---|---|
| 197,204 A | 11/1877 | Concannon et al. | |
| 709,741 A | 9/1902 | Burrill | |
| 1,062,069 A | 5/1913 | Wicksteed | |
| 2,052,068 A * | 8/1936 | Ziegler | 172/258 |
| 2,391,910 A | 4/1944 | Lutes | |
| 2,607,277 A * | 8/1952 | Shelor | 172/258 |
| 2,912,944 A | 11/1959 | Snow et al. | |
| 3,164,211 A * | 1/1965 | Scott | 172/19 |

(Continued)

OTHER PUBLICATIONS

"Agronimic Row Crops-Cultivator Components," found on-line at http://www.sare.org/publications/steel/pg26.htm, (Date Accessed Dec. 29, 2010).

*Primary Examiner* — Jamie L McGowan
(74) *Attorney, Agent, or Firm* — Hovey Williams LLP

(57) ABSTRACT

A tillage coulter unit (22, 122) adapted for use with a farm implement (10) permits high speed tillage operations (e.g., field fertilization using liquid fertilizer such as ammonia, or seeding) without undue soil disruption or fertilizer vaporization. The coulter unit (22, 122) includes an upright, rotatable coulter blade (26, 130) with a gauge assembly (28, 132) operable to limit the depth of the coulter blade into soil and to minimize soil disruption. The gauge assembly (28, 132) preferably includes a pair of elongated, shiftable belt or chain loops (74, 212, 214) positioned in straddling relationship and astride the blade (26, 130). The loops (74, 212, 214) present lower runs (96, 212a, 214a) which substantially contact the soil as the unit (22, 122) traverses a field.

12 Claims, 11 Drawing Sheets

(56) References Cited

U.S. PATENT DOCUMENTS

| | | | |
|---|---|---|---|
| 3,176,778 A * | 4/1965 | Bezzerides | 172/62 |
| 3,791,052 A * | 2/1974 | Van Der Lely | 37/305 |
| 4,656,957 A | 4/1987 | Williamson et al. | |
| 4,716,971 A | 1/1988 | Lanham | |
| 5,626,196 A | 5/1997 | Hughes | |
| 7,481,171 B2 | 1/2009 | Martin | |
| 8,453,755 B2 * | 6/2013 | Renyer et al. | 172/518 |
| 2010/0282480 A1 | 11/2010 | Breker et al. | |

* cited by examiner

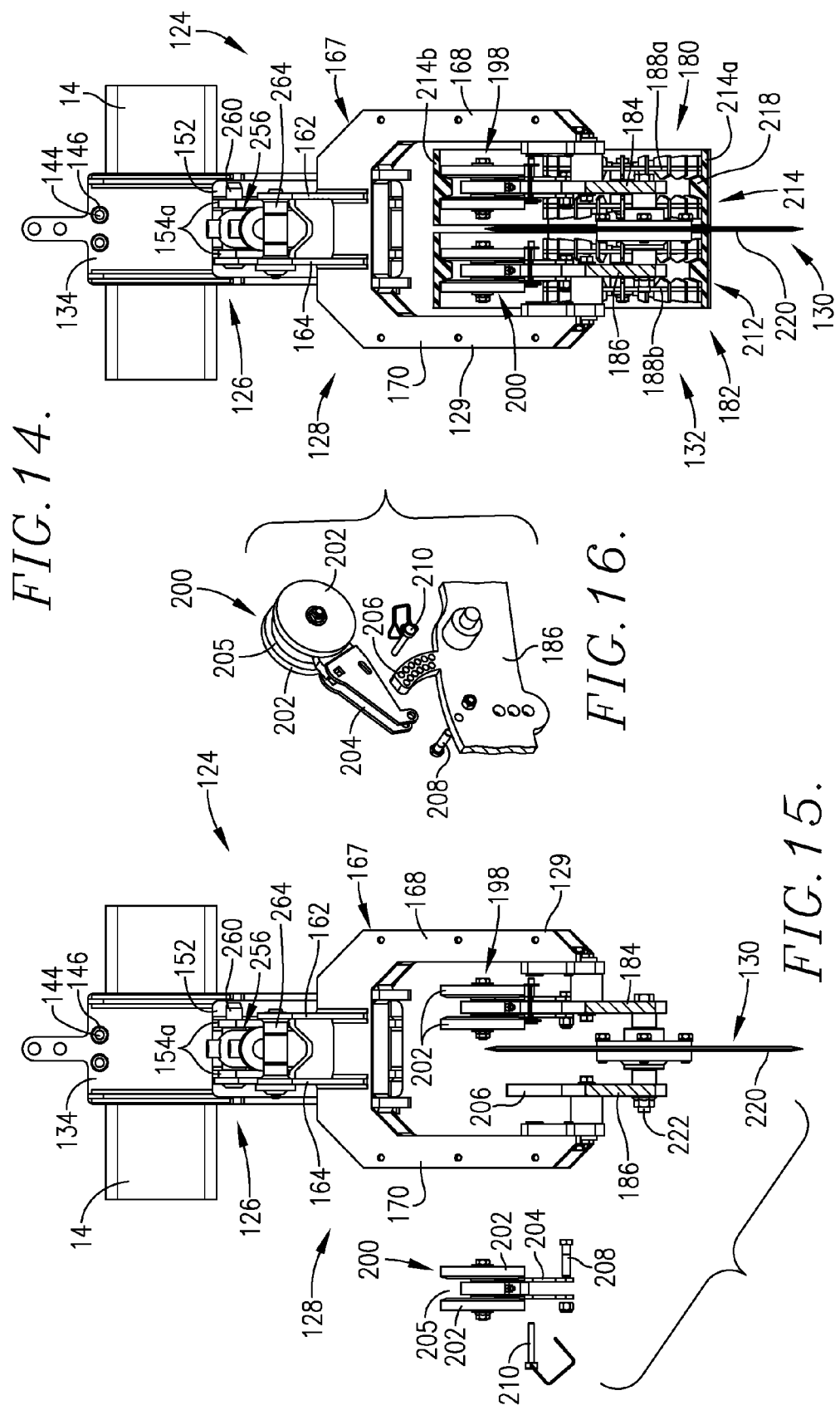

COULTER UNIT FOR HIGH SPEED TILLAGE APPLICATIONS

CROSS-REFERENCE TO RELATED APPLICATION

This application is a continuation-in-part of application Ser. No. 13/072,409, filed Mar. 25, 2011, which is incorporated by reference herein in its entirety.

BACKGROUND OF THE INVENTION

1. Field of the Invention

The present invention is broadly concerned with farm implements including soil-penetrating coulter units which are designed for high speed application of fertilizers (e.g., ammonia) or other products (e.g., seeds) to soil. More particularly, the invention is concerned with such implements, and the coulter units forming a part thereof, wherein the coulter units are provided with a gauge assembly to limit the depth of penetration of the coulter blade into soil, while also serving to minimize soil disruption. Preferably, the gauge assembly includes a pair of continuous, shiftable loops astride the coulter blade and arranged to engage the surface of the earth as the coulter unit traverses a field.

2. Description of the Prior Art

A variety of farm tillage implements have been provided in the past for seed planting or incorporation of various liquid preparations and/or other products into the soil. Generally, these types of implements include a plurality of rotatably mounted, disc-shaped coulter blades, which form slits or trenches in the soil as the implement is pulled through a field. In fertilizer or seeding applications, each coulter blade is typically trailed by a shoe or knife supporting a tube through which liquid fertilizer, seed or the like is incorporated into the soil. An implement of this character is described in U.S. Pat. No. 4,656,957.

A problem with conventional coulter implements, and especially those used in the context of soil fertilization, is the inability to rapidly pull the implements through the soil. Relatively high speed operation of such implements results in two adverse effects. First, such operation tends to unacceptably disrupt or "throw up" the soil adjacent the coulter blades leaving the field in a poor condition and making subsequent field operations more difficult. Second, because of these disruptions, the injected liquid fertilizer has an opportunity to vaporize into the atmosphere, such that the value of the fertilizer is lost.

There is accordingly a need in the art for an improved coulter design which overcomes the aforementioned problems and permits high speed and therefore more efficient field tillage operations, including fertilization and seeding.

U.S. Pat. No. 4,716,971 describes a tillage implement having coulter units, wherein a pair of driven, blade-cleaning belts are positioned on opposite sides of and in engagement with each coulter blade. However, each blade set is located adjacent the upper extent of the associated coulter blade, and therefore the belts are not designed for contact with the soil.

Other references of interest include U.S. Pat. Nos. 197,204, 709,741, 1,062,169, 2,391,910, 2,912,944, 5,626,196, 7,481,171; U.S. Published Patent Application No. 2010/0282480; and non-patent literature *Agronimic Row Crops-Cultivator Components*, found on-line at http://www.sare.org/publications/steel/pg 26.htm, (Date Accessed Dec. 29, 2010).

SUMMARY OF THE INVENTION

The present invention overcomes the problems outlined above and provides a mobile coulter unit operable to traverse soil and comprising a rotatable coulter blade having a pair of opposed side faces and operable to penetrate the soil as the coulter unit traverses the soil. The unit also includes a gauge assembly operable to limit the depth of said coulter blade in the soil and to minimize soil disruption as the coulter blade traverses the soil. The gauge assembly includes a pair of continuous, shiftable loops respectively located astride and proximal to a corresponding coulter side face so that the loops straddle the coulter blade. Each such loop presents an upper run and a lower run, with the lower run operable to engage the upper surface of the soil. Additionally, the gauge assembly includes apparatus for maintaining the lower loop runs in substantial contact with said soil surface as the coulter unit traverses the soil.

Preferably, the gauge assembly loops are oriented in a generally horizontal fashion and substantially span the diameter of the associated coulter blade. Advantageously, the loops extend a fore-and-aft distance greater than the diameter of the coulter blade whereby the opposite ends of said lower runs are each located outboard of the adjacent periphery of said coulter blade. The loops may be formed of any desired material suitable for field use, such as belts, chains, or the like; in some cases the loops are advantageously formed of continuous chains, and the latter may be provided with outer, apertured plates, which define the soil-engaging surfaces of the lower runs.

The preferred hold-down apparatus for the coulter unit comprises a piston and cylinder assembly operable to maintain a downward force on the coulter blade and gauge assembly, so as to maintain the proper coulter depth and substantial, continuous contact between the lower loop runs and the surface of the soil.

In the case of fertilizer application or seeding coulter units, it is preferred to provide a blade or shoe proximal to the trailing edge of the coulter blade, with the blade or shoe equipped with a tubular conduit having a lowermost open delivery end so that agriculturally useful products may be applied as the coulter unit traverses the field.

The shiftable components of the preferred coulter unit are non-powered, i.e., the rotation of the coulter blade and the shifting of the gauge assembly loops occurs by virtue of frictional engagement with the soil as the unit traverses a field.

A complete farm implement in accordance with the invention generally includes a mobile frame adapted to traverse soil and including a tool bar. A plurality of the coulter units of the invention are mounted in laterally spaced relationship across the width of the tool bar. The implement is generally equipped with appropriate height adjustment and hitch mounting structure permitting the implement to be coupled with a tractor or the like.

BRIEF DESCRIPTION OF THE DRAWINGS

FIG. 8 is an enlarged fragmentary sectional view illustrating the hub assembly forming a part of each coulter unit;

FIG. 14 is a vertical sectional view taken along the line 14-14 of FIG. 11;

FIG. 15 is a view similar to that of FIG. 14, but with parts removed to better illustrate details of the coulter unit;

FIG. 16 is a fragmentary, perspective, exploded view illustrating the belt tensioning assembly of the coulter unit;

DETAILED DESCRIPTION OF THE PREFERRED EMBODIMENT

Embodiment of FIGS. 1-8

Figure 1:
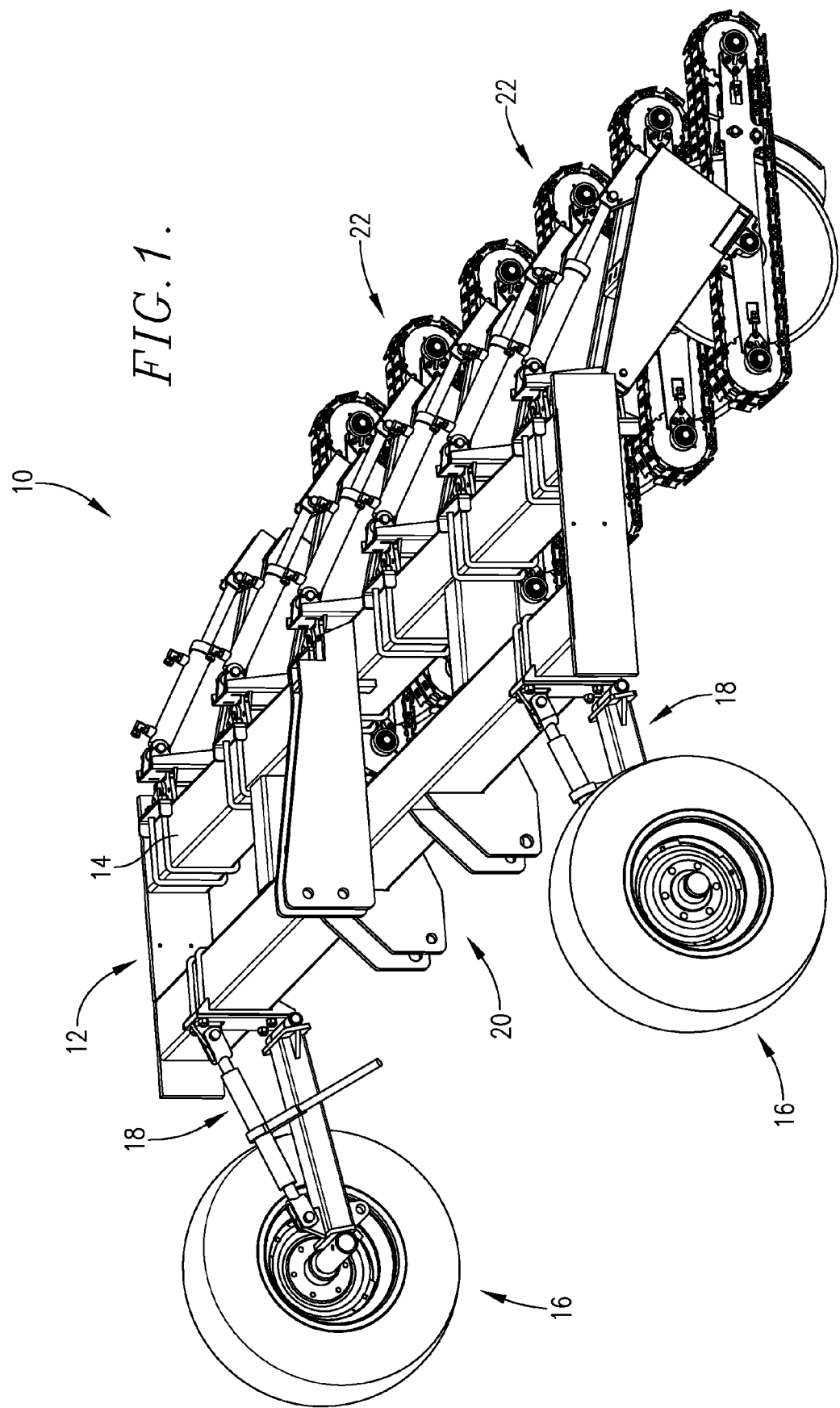
FIG. 1 is a perspective view of a tillage farm implement in accordance with the invention, including a mobile frame supporting a plurality of improved coulter units.

Turning now to the drawings, a tillage farm implement 10 is illustrated in FIG. 1. The implement 10 includes a main frame 12 having a rearward tool bar 14. The frame 12 is supported by a pair of ground wheels 16 secured by means of conventional implement height adjustment mechanisms 18. The frame 12 is equipped with three-point hitch mounting structure 20 allowing the implement 10 to be coupled to a tractor hitch. A plurality of coulter units 22 are secured to tool bar 14 in laterally spaced relationship so that the units 22 span the width of implement 10. As will be readily understood, the implement 10 is designed to be pulled by a tractor or the like across a field so that the coulter units 22 traverse and penetrate the soil.

Figure 2:
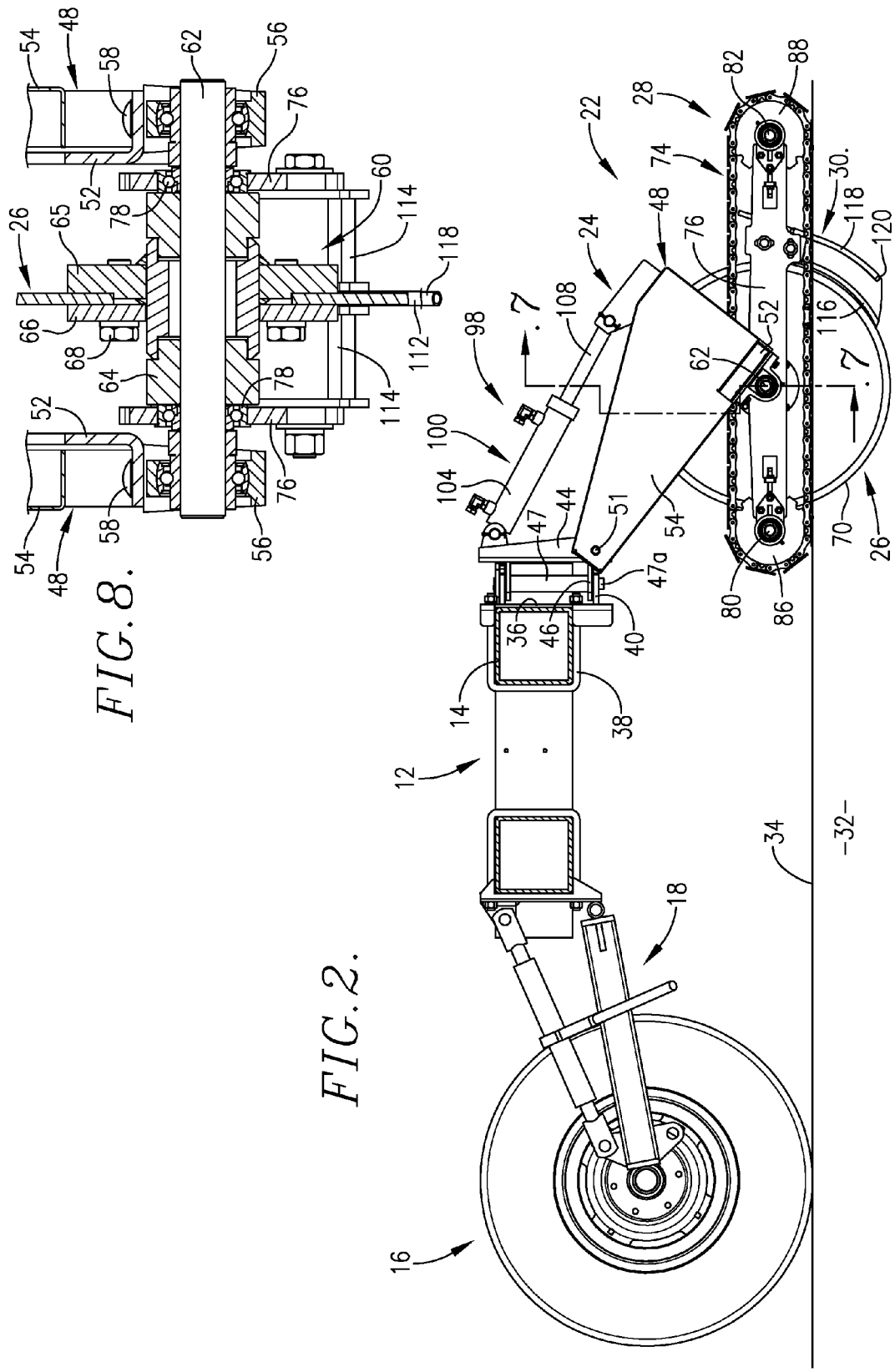
FIG. 2 is a vertical sectional view of the implement illustrated in FIG. 1, and further depicting one of the coulter units.
Figure 3:
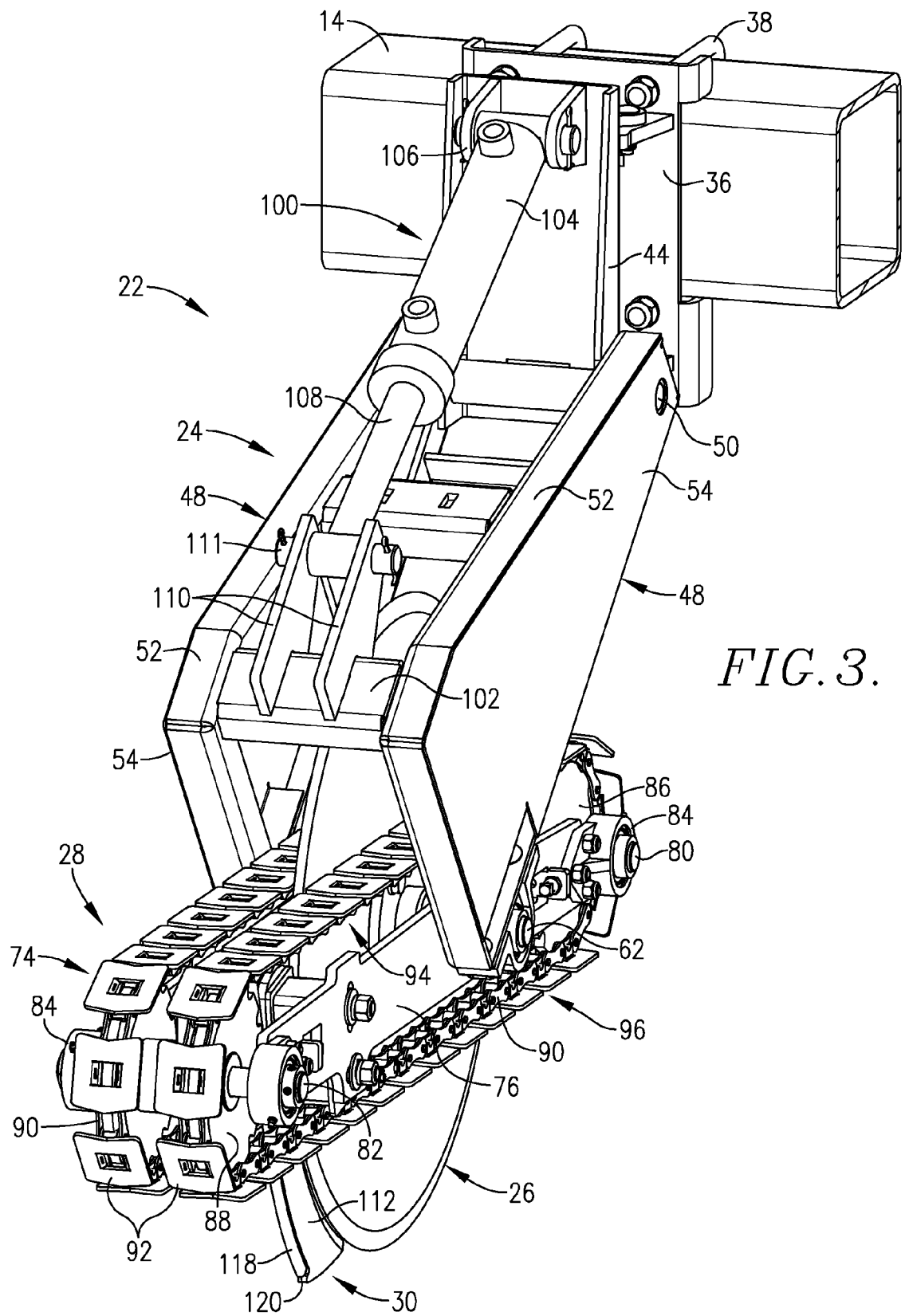
FIG. 3 is a fragmentary rear perspective view of one of the coulter units.
Figure 5:
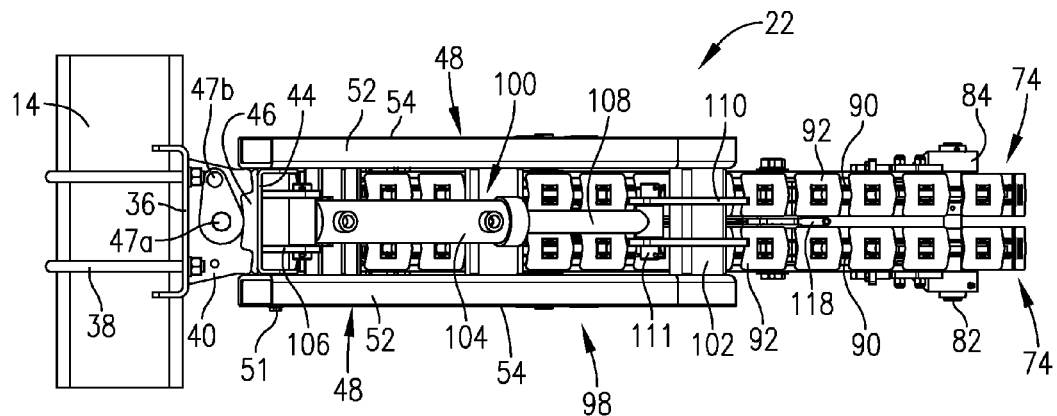
FIG. 5 is a plan view of one of the coulter units.
Figure 4:
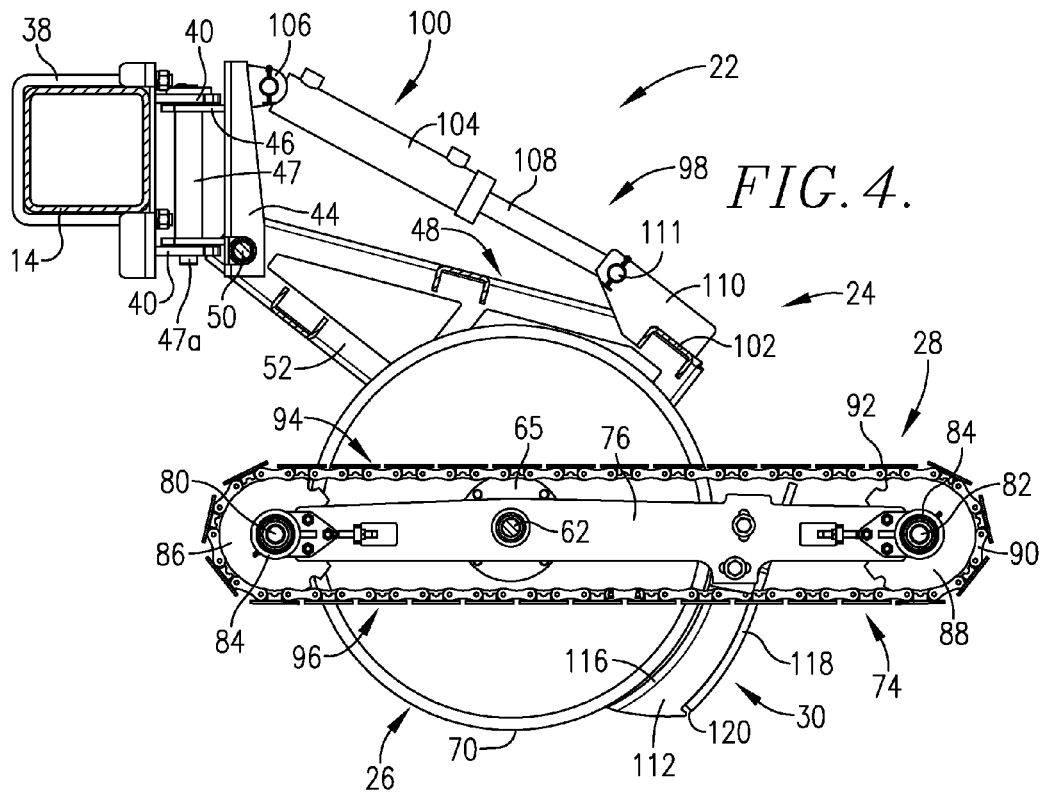
FIG. 4 is a side elevational view of a coulter unit, with one of the side frames removed.

Referring to FIGS. 2 and 3, each coulter unit 22 generally includes frame structure 24 supporting a rotatable coulter blade 26, a dual-loop gauge assembly 28, and a fertilizer application shoe 30. The coulter blade 26 is designed to penetrate the soil 32 with the gauge assembly 28 engaging the upper surface 34 of soil 32 in order to permit high speed travel of implement 10 with application of agriculturally useful products via shoe 30.

In more detail, the frame structure 24 comprises an uppermost mounting plate 36, which is secured to tool bar 14 by means of U-bolts 38. The mounting plate has a pair of rearwardly projecting, vertically spaced apart, bifurcated, apertured ears 40. A rearward, somewhat U-shaped plate 44 is located adjacent the plate 36 and has apertured flanges 46 supporting an upright tube 47. The flanges 46 interfit within the ears 40, and a vertical pin 47a with an upper lateral locking flange is positioned within the tube. A bolt 47b extends through the locking flange and the upper ear 40 to hold pin 47a in place. The plate 44 is thus supported for limited swinging movement about the axis of pin 47a and relative to tool bar 14. In the present embodiment, the plate 44 (and hence the coulter unit itself) swings through a total arc of 15°.

A pair of downwardly extending side plates 48 are pivotally secured to the lower end of plate 44 by means of cross shaft 50, the latter secured in place by bolt 51. Each side plate 48 has a side channel frame 52 and an outer facia plate 54. As best seen in FIG. 8, a pillow block bearing assembly 56 is secured to the lower end of each side channel frame 52 by means of connectors 58. In order to rigidify the overall frame structure, the side channel frames are interconnected to each other by appropriate channel crosspieces so as to define a unified box frame.

The frame structure 24 also includes a coulter mount 60 (see FIG. 8) including an elongated, horizontally extending axle 62 which is supported by the bearing assemblies 56. A coulter hub 64 is mounted on axle 62 between the assemblies 56, with the hub 64 in turn supporting an annular ring 65. The coulter blade 26 is clamped to ring 65 by means of a separate clamp ring 66, using threaded connectors 68. In this fashion, the blade 26 and axle 62 are supported for rotation by the pillow block bearings 56. The coulter blade 26 is itself conventional and includes an outermost, tapered, soil-penetrating periphery 70.

The gauge assembly 28 includes a carriage 72 (FIG. 6) supported by the frame structure 24, as well as a pair of continuous, shiftable loops 74 carried by the carriage 72; the loops 74 are each astride an opposite face of the coulter blade 26 so that the loops straddle the blade.

Figure 7:
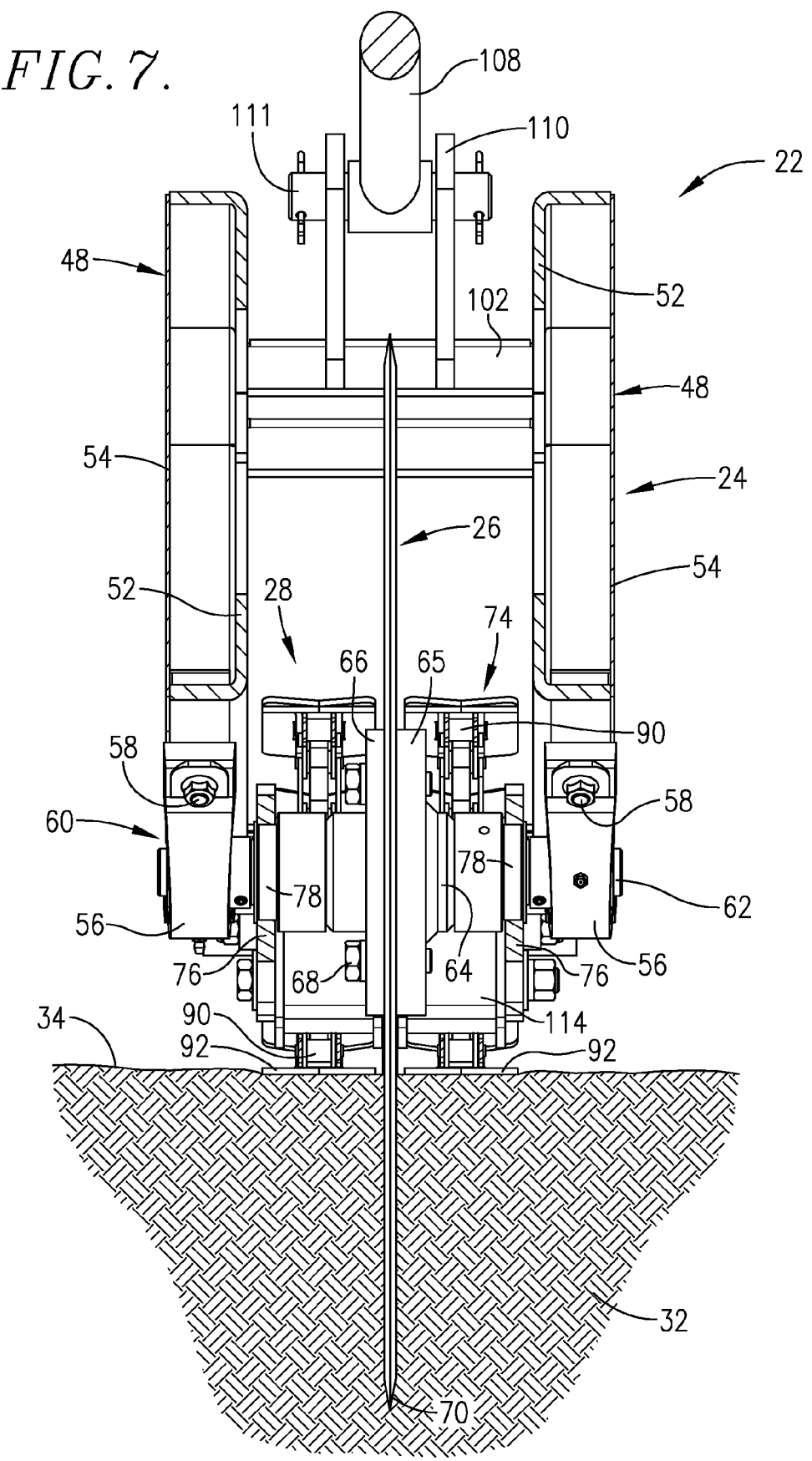
FIG. 7 is an enlarged vertical sectional view taken along the line 7-7 of FIG. 2.

In detail, the carriage 72 includes a pair of fore-and-aft extending side plates 76 equipped with bearings 78 (FIG. 8) receiving the axle 62 so that the plates 76 may rotate relative to the axle. A pair of fore-and-aft cross shafts 80, 82 extend between the opposed side plates 76 and are supported for rotation by outboard bearings 84. The shafts 80, 82 also have inner bearings 85 supporting a pair of laterally spaced apart fore-and-aft sprockets 86 and 88, to present a pair of aligned, axially spaced apart sprocket sets each made up of a sprocket 86 and a sprocket 88. A pair of continuous, identical, looped, shiftable roller chains 90 are respectively trained about each such sprocket set, so that the chains 90 are astride the blade 26 in a straddling relationship thereto. Each of the chains 90 has a plurality of apertured soil-engaging plates 92 affixed thereto. In the embodiment shown, a plate 92 is welded or otherwise secured to every other link of each roller chain 90. As best illustrated in FIG. 7, the plates 92 are substantially wider than the width of the associated chains 90, such that the inner ends of the plates 90 are closely adjacent to the opposed faces of the blade 26.

It will further be observed that, by virtue of the fore-and-aft oval configuration of the chains 90 supported on the sprockets 86, 88, the chains present generally horizontal, upper and lower chain runs 94, 96. Moreover, the fore-and-aft length of the chain loop runs are greater than the diameter of the coulter 26, so that the opposite ends of the chain loops are located outboard of the periphery 70 of coulter 26.

The gauge assembly 28 also has apparatus 98 operable to maintain coulter 26 at a substantially constant soil depth, and to ensure that the lower runs 96 of the chains 90 are maintained in substantial contact with the surface 34 of the soil 32. The apparatus 98 includes a conventional piston and cylinder assembly 100 coupled between rear plate 44 and a crosspiece 102 forming a part of the channel frame 52 (see FIG. 3). In particular, the upper end or base of cylinder 104 is pivotally coupled to the upper end of plate 44 via bracket 106, whereas the outer end of rod 108 is pivotally fastened to rigid connectors 110 mounted on crosspiece 102, be means of cross pin arrangement 111.

Figure 6:
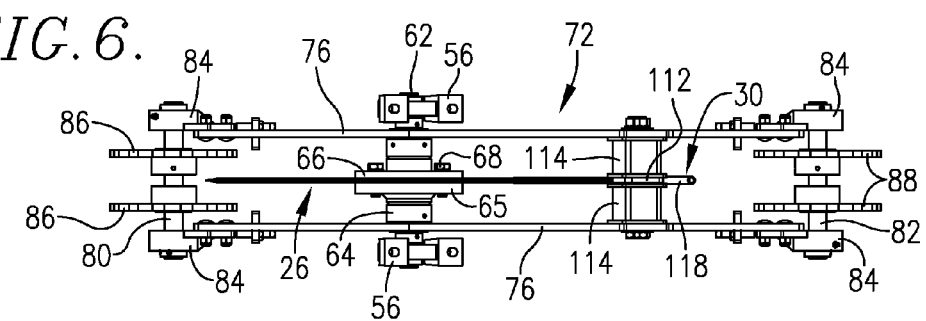
FIG. 6 is a plan view of the carriage structure forming a part of each coulter unit.

The application shoe 30 is in the form of an arcuate segment 112, which is attached to a cross-member 114 extending between the carriage plates 76 (FIG. 6). The segment 102 has a leading edge 116 in substantial alignment with the periphery 70 of coulter 26, and a trailing applicator tube 118 terminating at a lower open end 120. Although not shown, it will be appreciated that in fertilizer applications, the implement 10 typically carries a supply of liquid fertilizer (e.g., ammonia), with individual supply tubes leading from the fertilizer supply to the upper end of the individual tubes 118. In like manner, in seeding operations the implement 10 would have a supply of seed and seed-supplying tubes coupled between the seed supply and the individual tubes 118.

Operation

In use, the implement 10 is conventionally coupled with a tractor, using the hitch mounting structure 20. The implement height may also be adjusted using the height adjustment mechanisms 18. As the implement 10 is pulled through a field, the blades 26 penetrate the soil 32 owing to the downwardly directed forces exerted by the respective piston and cylinder assemblies 100. Additionally, this serves to place the lower runs 96 of the chains 90 into substantial and continuous contact with the upper surface 34 of the soil. This soil contact serves to minimize soil disruption which would otherwise be effected by the movement of the blades 26 through the soil 32. In addition, during application of a fertilizer such as ammonium, the trailing sections of the runs 96, rearward of the applicator tube 118, assures that the openings created by the blades 26 are quickly closed, thereby preventing substantial vaporization of the fertilizer to the atmosphere. It has been found that use of coulter units in accordance with the invention permits field fertilization at implement speeds greatly in excess of common practices, e.g., on the order of 7-9 miles per hour. Similar speeds can be reached when the implement 10 is used for seeding.

The use of the apertured chain-mounted plates 92 serves to facilitate elimination of trash or field debris, which may otherwise collect in the chains 90. Moreover, the width of the plates 92, extending to a point proximal to the opposed faces of the blades 26, provides a means of controlling soil disruption and effectively closing the openings created by the blades 26.

Although the coulter units 22 have been depicted and described with the use of roller chain loops 74, for reasons of cost and ease of replacement, the loops 74 may be advantageously formed of reinforced synthetic resin belting material, with or without soil-engaging plates.

Embodiment of FIGS. 9-20

FIGS. 9-20 depict another embodiment in accordance with the invention, in the form of an improved coulter unit 122 designed to form part of an overall tillage farm implement, such as the previously described implement 10. To this end, a plurality of coulter units 122 are supported in laterally spaced relationship along the length of the tool bar 14 of the implement, the latter being designed to be pulled by a tractor or the like across a field so that the coulter units 122 traverse and penetrate the soil.

Each coulter unit 122 broadly comprises frame structure 124 including a rigid mounting assembly 126 and a pivotal supporting assembly 128, a coulter 130, a shoe assembly 131, and a dual-loop gauge assembly 132.

Figure 9:
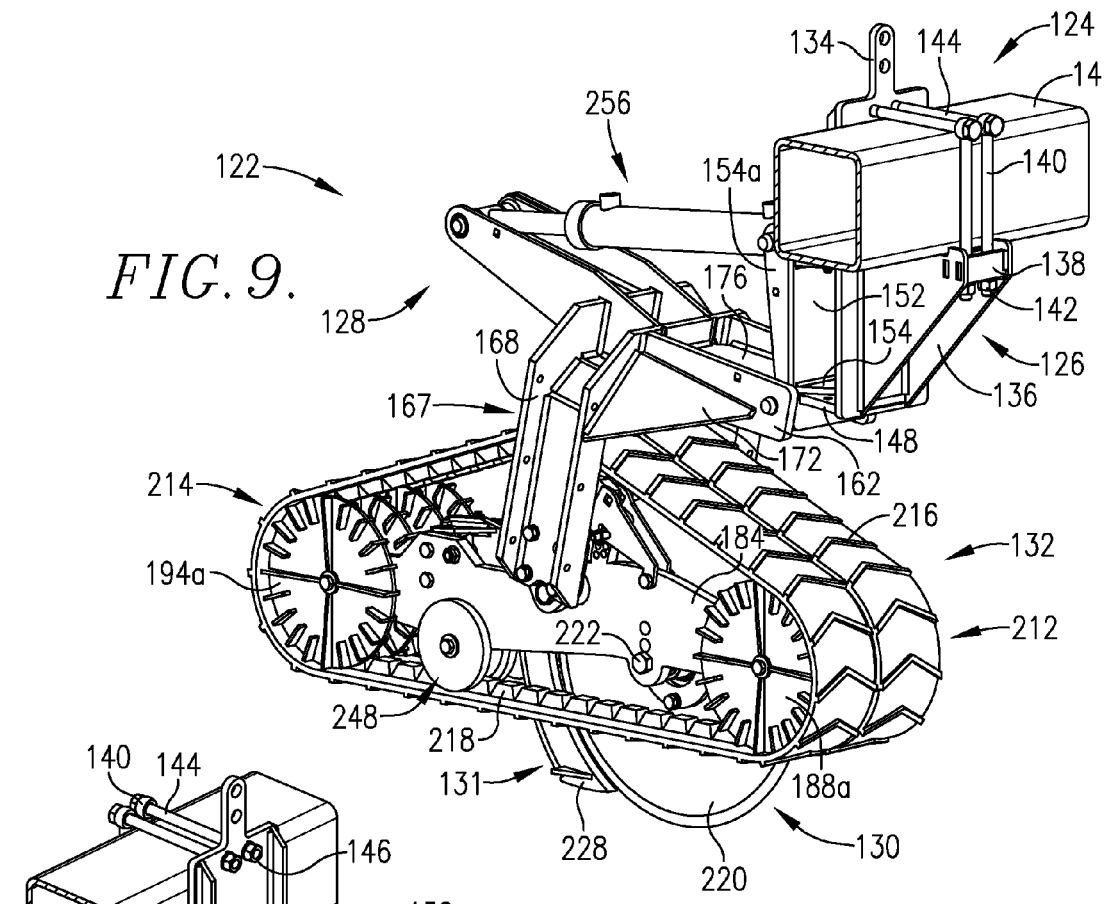
FIG. 9 is a front perspective view of another coulter unit in accordance with the invention.
Figure 10:
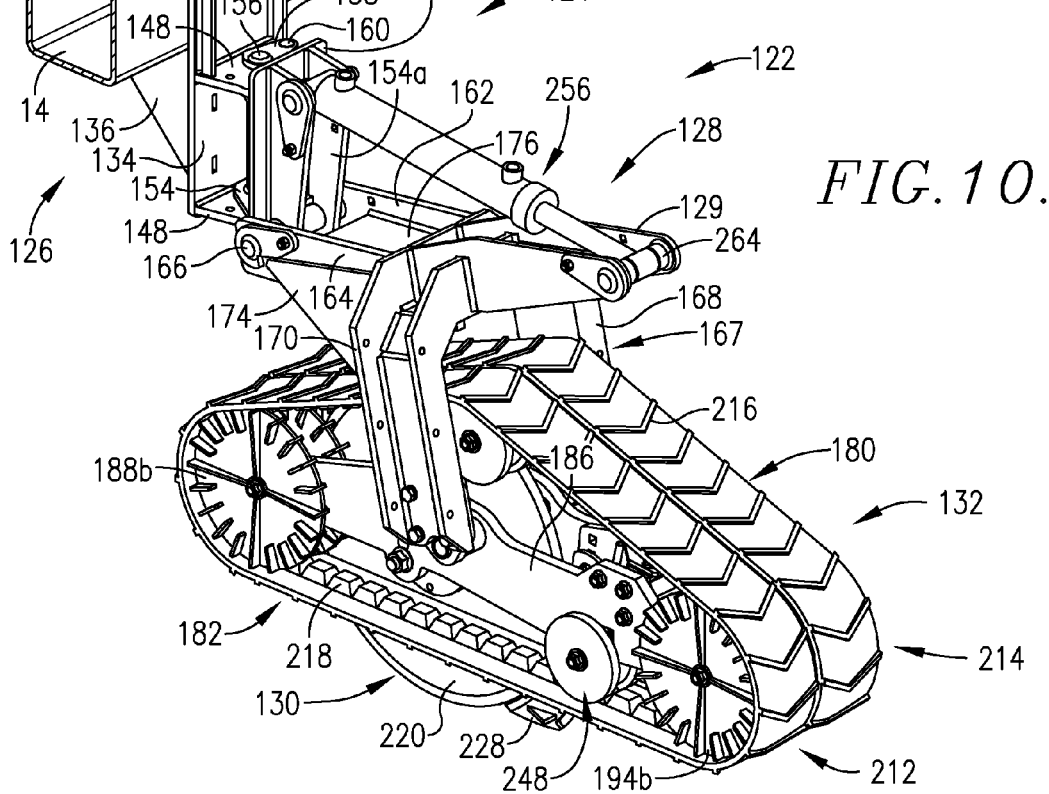
FIG. 10 is a left rear perspective view of the coulter unit illustrated in FIG. 9.
Figure 12:
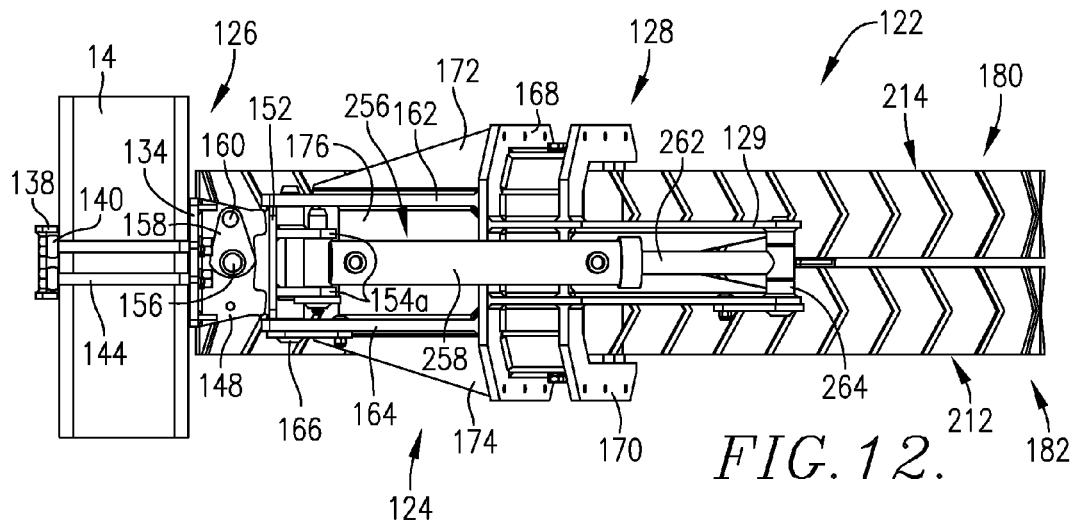
FIG. 12 is a plan view of the coulter unit of FIGS. 9-10.
Figure 11:
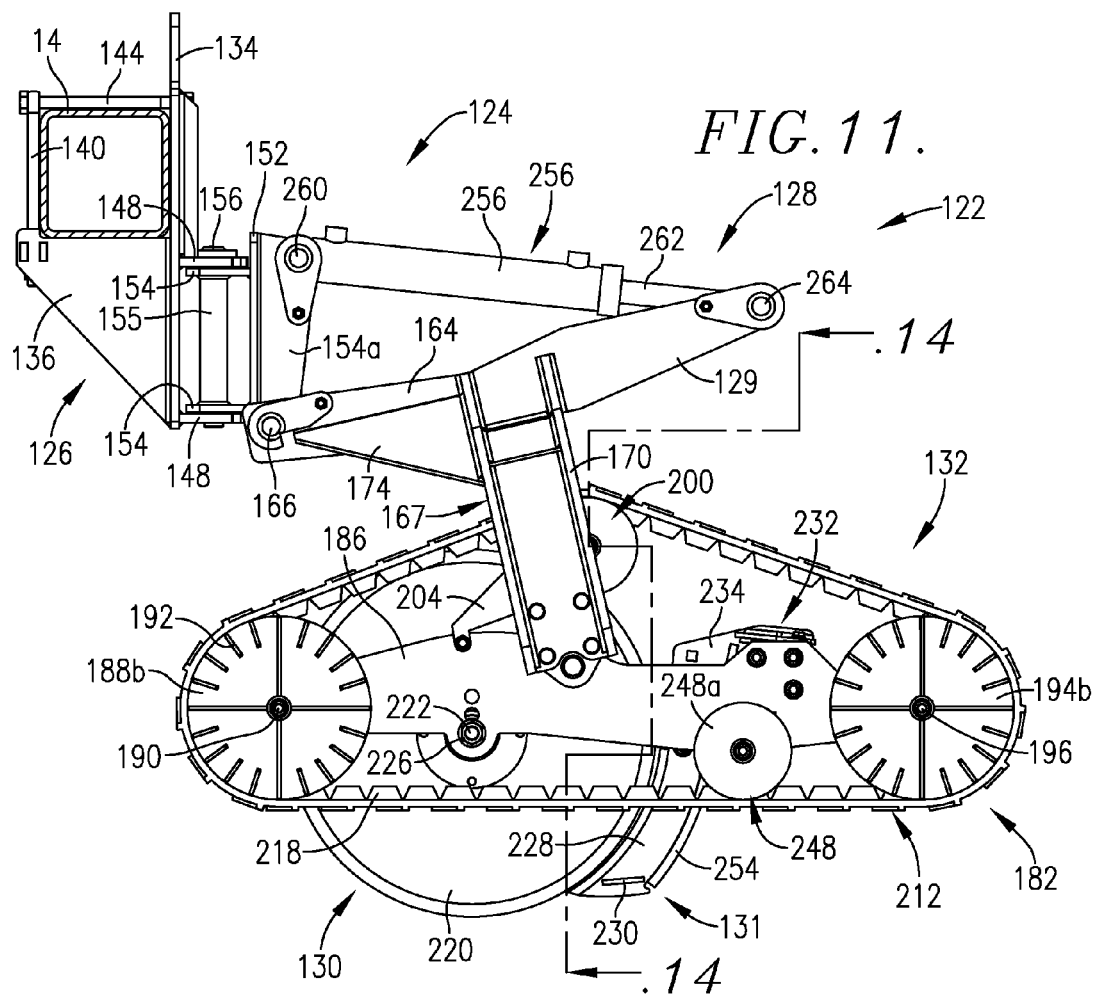
FIG. 11 is an elevational view of the coulter unit of FIGS. 9-10.

In more detail, the mounting assembly 126 includes an upper apertured plate 134 adapted to abut the upright trailing face of tool bar 14 and having a pair of spaced apart, forwardly extending, generally triangular gussets 136 designed to engage the underside of the tool bar 14. A transverse apertured mounting block 138 extends between the gussets 136 adjacent the upper ends thereof (FIG. 9). The plate 134 is secured to tool bar 14 by means of a pair of vertical eye bolts 140 extending through the block 138 and secured by nuts 142. A pair of connector bolts 144 extend through the eyes of the bolts 140 and through the plate 134, and nuts 146 are secured to the rearward ends of the connector bolts 144. In this fashion, the plate 134 is rigidly secured to the tool bar 14.

A pair of vertically spaced apart, upper and lower ears 148 extend rearwardly from plate 134. A generally U-shaped weldment 152 having forwardly extending upper and lower flanges 154 and rearwardly extending side pieces 154a is located rearwardly of the plate 134, with the flanges 154 interfitted between the ears 148. The flanges 154 support an upright tube 155 which receives a pin 156 secured to the upper ear 148. The pin 156 carries an apertured locking flange 158. A bolt 160 extends through the locking flange 158 and into the upper ear 148 so as to releasably secure the weldment 152 in place. This arrangement also allows limited swinging movement of the weldment 152 about the axis of pin 156 and relative to tool bar 14. The range of movement of the weldment 152 is 15°.

The support assembly 128 of frame structure 124 is secured to the weldment 152. In particular, the assembly 128 is in the form of a weldment unit 129 having a pair of rearwardly projecting, laterally spaced apart, slotted side plate assemblies 162, 164. The forward ends of the assemblies 162, 164 are pivotally coupled to the lower ends of weldment side pieces 154a by means of cross-axle 166. A generally U-shaped support arm 167 is received within the slots of the weldment unit 129 and is welded thereto, so as to define a pair of outwardly and downwardly extending mounting arms 168, 170 intermediate the ends of the plate assemblies. In order to rigidify the support assembly 128, a pair of gusset reinforcements 172, 174 are secured between each side plate assembly 162, 164 and the corresponding mounting arm 168, 170, and a horizontal plate 176 is welded to the assemblies 162, 164.

The gauge assembly 132 is supported on the mounting arms 168, 170, and in general has a pair of identical ground-engaging belt assemblies 180, 182. Each such assembly has a rigid, fore-and-aft extending support member 184, 186, which is fixedly secured to the lower end of a corresponding mounting arm 168, 170; the members 184, 186 and associated structure thereby provides a carriage assembly. The forward end of each member 184, 186 is equipped with a pair of circular, peripherally flanged belt supports 188a, 188b, which are rotatably mounted astride the members 184, 186 via axle 190. Each of the belt supports 188a, 188b, is a thin, circular metallic body having a series of circumferentially spaced apart, radially oriented flanges 192 extending outwardly from the opposed faces thereof. In like manner, the rearward ends of each member plate 184, 186 has belt supports 194a, 194b, which are identical with supports 188a, 188b and are rotationally mounted via axle 196.

The support members 184, 186 further support belt tensioning assemblies 198, 200 (FIG. 16). That is, each such tensioning assembly includes a pair of side disks 202 secured to and rotationally supported on a bifurcated bracket 204 to define a groove 205 between the disks 202. The bracket 204 is mounted for selective, up-and-down relative motion relative to the corresponding support member 184 or 186. Each support member includes an upstanding, arcuate extension 206 having a series of through apertures, along with a mounting bolt 208 extending through the support plate. The lower end of the bracket 204 is pivotally secured to the corresponding support member by means of the bolt 208, and the extension 206 extends through the bracket between the bolt 208 and the disks 202. A detachable locking pin 210 extends through the bracket and one of the extension through apertures in order to releasably secure the bracket 204 in place, and to allow selective up-and-down pivotal adjustment thereof.

Figure 13:
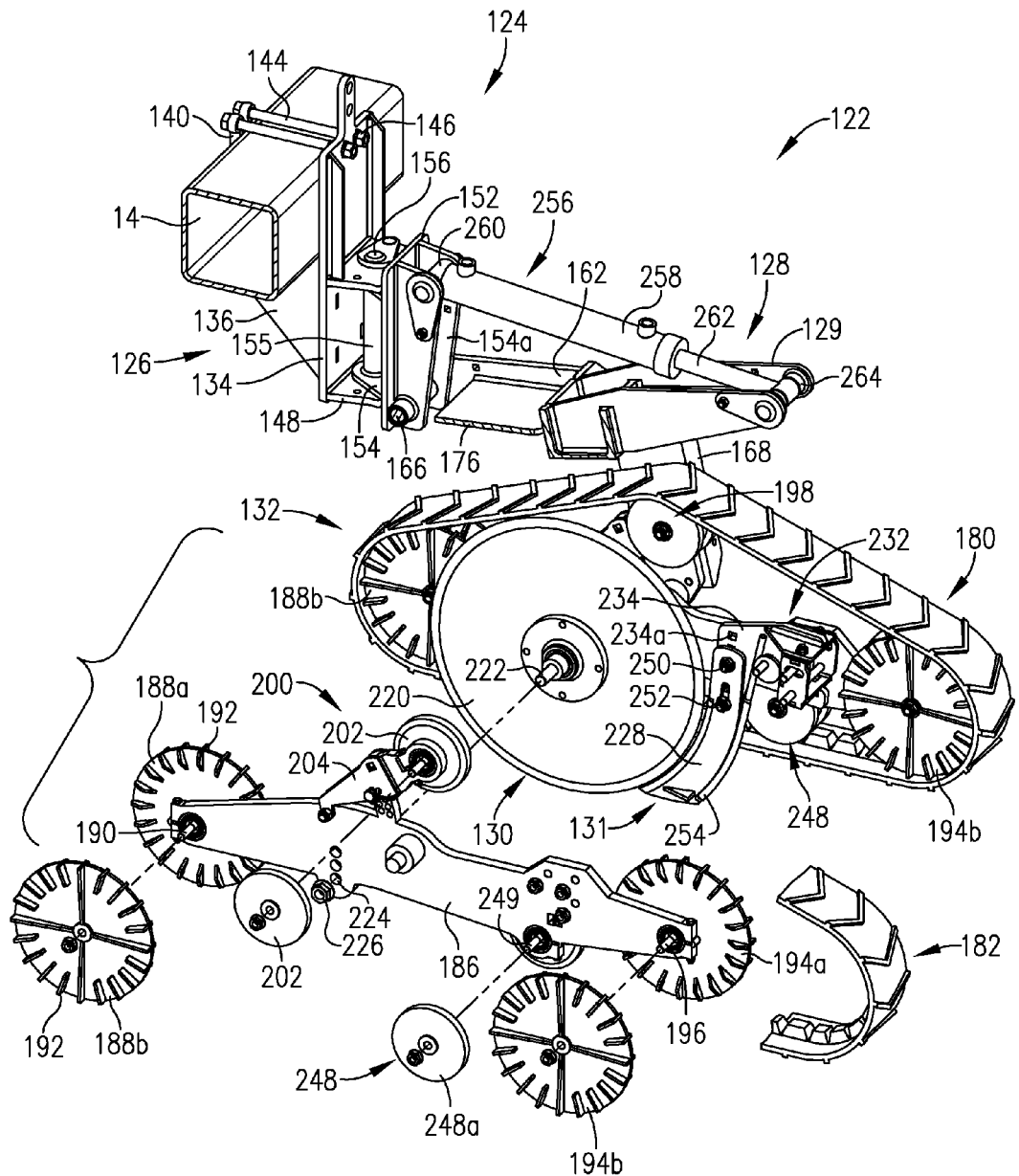
FIG. 13 is a fragmentary perspective view of the coulter units of FIGS. 9-10, with one of the ground loop assemblies of the unit being illustrated in exploded relationship.
Figure 17:
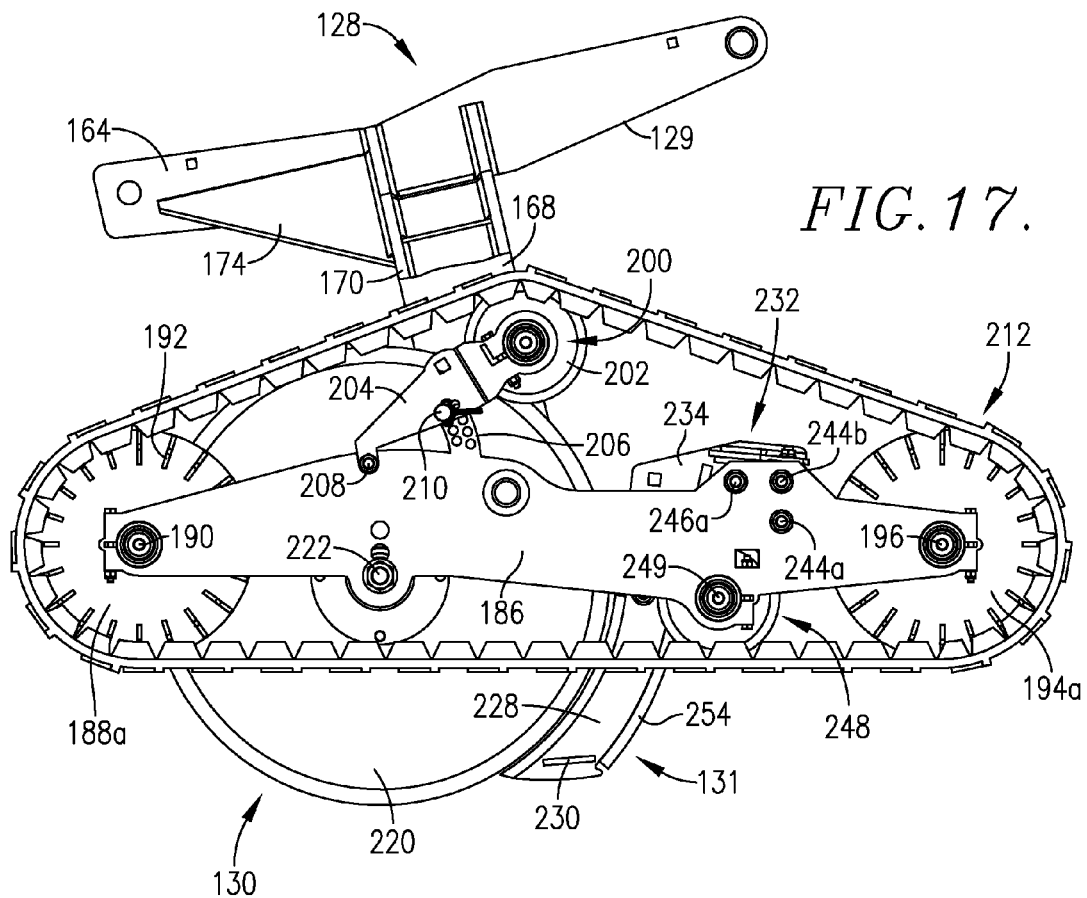
FIG. 17 is an elevational view of the coulter unit of FIGS. 9-10, with parts removed for clarity.
Figure 18:
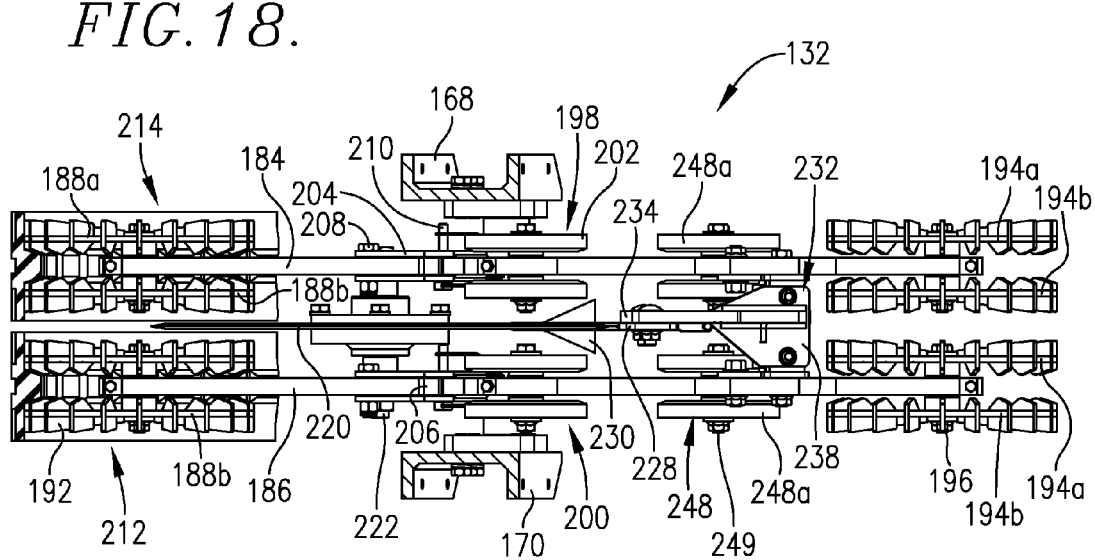
FIG. 18 is a horizontal sectional view of the gauge assembly, with portions of the ground-engaging belts being removed.
Figure 19:
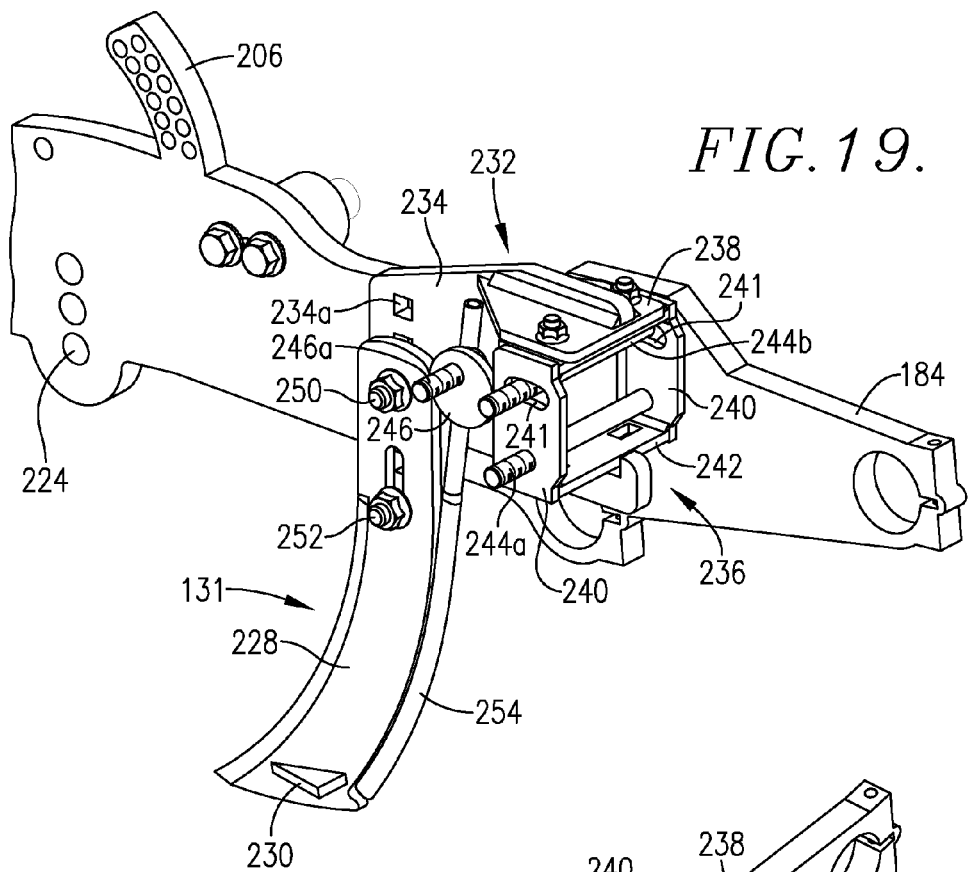
FIG. 19 is a fragmentary perspective view of the shoe support assembly of the coulter unit.
Figure 20:
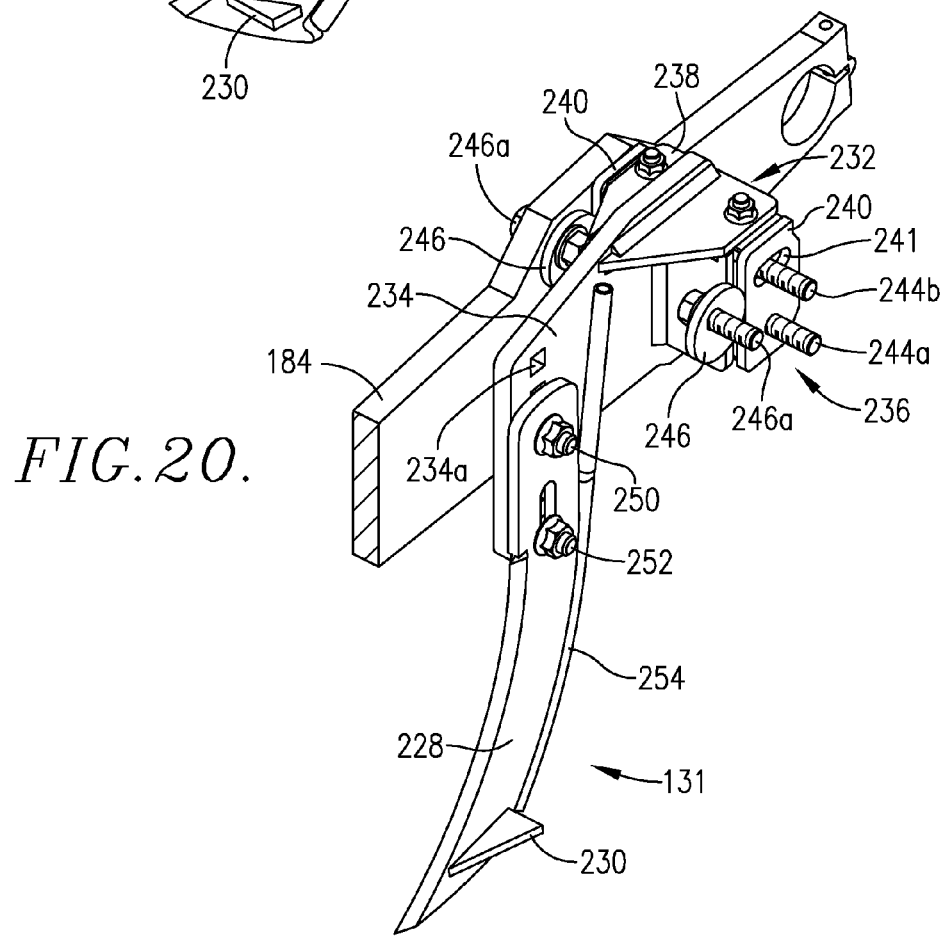
FIG. 20 is a fragmentary, top perspective view of the shoe support assembly.

Each of the assemblies 180, 182 is equipped with a continuous, synthetic resin, ground-engaging belt 212, 214. The belts 212, 214 and the support structure therefor are identical, and accordingly only the belt 214 and its support structure will be described in detail. The belt 214 includes a series of longitudinally spaced apart, outermost, chevron-shaped ground cleats 216, as well as a series of upstanding, internal, centrally located guide cleats 218. The belt 214 is trained about the endmost pairs of rotatable belt supports 188a, 188b and 194a, 194b, with the internal cleats 218 passing between these belt supports. In like manner, the peripherally grooved wheel 202 of the belt support tensioning assembly 200 receives these internal cleats 218. As best seen in FIG. 13, the belt 214 presents a lowermost, substantially rectilinear run 214a and a peaked or gabled upper run 214b created by means of the tensioning assembly 200.

The coulter 130 is in the form of a thin, circular, rotatable plate 220 which is positioned centrally between the belt assemblies 180, 182. The plate 220 is supported for rotation about an axle 222, the latter extending through a set of aligned mounting apertures 224 provided on each of the members 184, 186, with nuts 226 serving to secure the axle 222 in place.

The shoe assembly 131 (see FIGS. 19-20) includes an arcuate shoe 228 having lower outwardly extending wings 230, and a mounting assembly 232. The assembly 232 includes a central mounting plate 234 coupled to a box housing 236 including a top wall 238, a pair of depending, slotted outboard sidewall plates 240 adjacent a corresponding member 184, 186, and a bottom cross-plate 242. Each of the sidewall plates 240 are attached to the adjacent member 184, 186 by means of a pivot bolt 244a, and a pivot adjustment bolt 244b extending through the slots 241 of the sidewall plates 240. A locking cam 246 is secured to each of the members 184, 186 by means of a cam locking bolt 246a; each of the cams 246 is oriented to engage the adjacent sidewall plate 240. Rotational supports 248, each including a pair of side disks 248a supported on a bolt 249 extending through the corresponding support member 184, 186, are situated below the cross-plate 242, and engage the corresponding belt 212, 214 on opposite sides of the internal cleats 218.

The shoe 228 is secured to the plate 234 by means of upper and lower bolts 250, 252. As best seen in FIG. 13, the mounting plate 234 has a series of square through apertures 234a which receive the bolts 250, 252, thereby allowing the shoe 228 to be vertically positioned for a desired soil depth. The shoe 228 also supports a trailing applicator tube 254 having a lower open end.

The gauge assembly 132 has apparatus 256 operable to maintain coulter 130 at a substantially constant soil depth, and to ensure that the lower runs 212a, 214a are maintained in substantial contact with the surface of the soil. The apparatus 256 includes a conventional piston and cylinder assembly 258 coupled between the weldment 152 and the outboard ends of the plate assemblies 162, 164. In particular, the upper end of the assembly 258 is pivotally secured to the weldment 152 by means of pivot mount 260, and similarly the outboard end of the piston 262 of assembly 258 is pivotally secured to the plate assemblies 162, 164 by a pivot mount 264.

Operation

The operation of each coulter unit 122 is very similar to that of the previously described coulter units 22. During initial setup of the coulter unit 122, the tensioning assemblies 198, 200 are adjusted to provide the desired degree of tension on the belts 212, 214, and the shoe 228 is properly adjusted. This involves loosening of the bolts 250, 252 to properly orient the shoe 228 for a desired soil depth. Thereupon, the bolts 244b are loosened and the box housing 236 and mounting plate 234 are pivoted about bolt 244a to achieve the desired inclination of shoe 228. The bolts 244b are then re-tightened. The cam bolts 246a are then loosened, and each cam is moved into firm engagement with the adjacent sidewall plate 240, whereupon the bolts 246a are re-tightened. This locks the shoe in the desired position.

After such initial adjustments, the unit 122 is pulled through a field with the coulter 130 penetrating the soil owing to the downwardly directed force exerted by the piston and cylinder assembly 258. This also serves to place the lower runs 212a, 214a of the belts 212, 214 into substantial and continuous contact with the upper surface of the soil, so that the belts are continuously moved about the belt support structure.

It will be appreciated that the belts 212, 214 are substantially wider than the roller chains 90 and pads 92 of the previous embodiment. Furthermore, the belts 212, 214 are essentially self-cleaning owing to the width thereof and the provision of the flange belt supports 188a, 188b and 194a, 194b. This overcomes the problems sometimes encountered with the chain and pad assemblies of the first embodiment, which can become clogged with field trash and are subject to rapid wear. Finally, the peaked orientation of the upper runs 212b, 214b allows easier access to the internal components, especially the shoe 228 and application tube 254.

We claim:

1. A method of tilling soil, comprising the steps of:
    moving a tillage unit so as to traverse said soil, said tillage unit including a coulter blade having a pair of opposed side faces, with the coulter blade penetrating the soil as the coulter unit traverses the soil;
    limiting the depth of the coulter blade in the soil during said soil traversal by shifting a pair of loops respectively located astride and proximal to a corresponding coulter side face, each of said loops presenting an upper run and a lower run, said shifting step including the step of causing said lower runs to engage the upper surface of the soil,
    said loops supported by a carriage assembly having, for each loop, spaced apart fore and aft lower loop supports, said lower runs of said loops being generally flat and extending between corresponding fore and aft lower loop supports; and
    maintaining said lower loop runs in substantial contact with said soil surface as the coulter unit traverses the soil.

2. The method of claim 1, each of said loops comprising a continuous belt which extends a fore and aft distance greater than the diameter of said coulter blade whereby the opposite ends of said lower runs are located outboard of the periphery of said coulter blade.

3. The method of claim 1, each of said loops comprising a continuous chain or belt.

4. The method of claim 3, each of said loops comprising a continuous belt, said belts having outer soil-engaging cleats and internal guiding cleats.

5. The method of claim 3, each of said loops having a plurality of apertured plates secured thereto and defining the soil-engaging surfaces of said lower runs.

6. The method of claim 1, the rotation of said coulter blade and the shifting of said loops occurring by virtue of frictional engagement with the soil as the unit traverses the soil.

7. A method of tilling soil, comprising the steps of:
   moving a tillage unit so as to traverse said soil, said tillage unit including a circular coulter blade having a pair of opposed side faces, with the coulter blade penetrating the soil as the coulter unit traverses the soil, said coulter blade presenting a radius;
   limiting the depth of the coulter blade in the soil during said soil traversal by shifting a pair of loops respectively located astride and proximal to a corresponding coulter side face, each of said loops presenting an upper run and a lower run with the lower run of each loop having a length greater than said radius of the coulter blade, said shifting step including the step of causing said lower runs to engage the upper surface of the soil; and
   maintaining said lower loop runs in substantial contact with said soil surface as the coulter unit traverses the soil.

8. The method of claim 7, each of said loops comprising a continuous belt which extends a fore and aft distance greater than the diameter of said coulter blade whereby the opposite ends of said lower runs are located outboard of the periphery of said coulter blade.

9. The method of claim 7, each of said loops comprising a continuous chain or belt.

10. The method of claim 9, each of said loops comprising a continuous belt, said belts having outer soil-engaging cleats and internal guiding cleats.

11. The method of claim 9, each of said loops having a plurality of apertured plates secured thereto and defining the soil-engaging surfaces of said lower runs.

12. The method of claim 7, the rotation of said coulter blade and the shifting of said loops occurring by virtue of frictional engagement with the soil as the unit traverses the soil.

\* \* \* \* \*